US012460069B2

(12) United States Patent
Wannerskog et al.

(10) Patent No.: US 12,460,069 B2
(45) Date of Patent: Nov. 4, 2025

(54) FOAMING BEHAVIOUR OF POLYMER COMPOSITIONS USING PASSIVE NUCLEATION

(71) Applicant: Borealis AG, Vienna (AT)

(72) Inventors: Asa Wannerskog, Stenungsund (SE); Anna Hjartfors, Stenungsund (SE); Oscar Prieto, Stenungsund (SE); Martin Anker, Stenungsund (SE); Ann Watson, Arbroath (GB)

(73) Assignee: BOREALIS GMBH, Vienna (AT)

( * ) Notice: Subject to any disclaimer, the term of this patent is extended or adjusted under 35 U.S.C. 154(b) by 703 days.

(21) Appl. No.: 17/414,374

(22) PCT Filed: Dec. 3, 2019

(86) PCT No.: PCT/EP2019/083556
§ 371 (c)(1),
(2) Date: Jun. 16, 2021

(87) PCT Pub. No.: WO2020/126487
PCT Pub. Date: Jun. 25, 2020

(65) Prior Publication Data
US 2022/0064419 A1 Mar. 3, 2022

(30) Foreign Application Priority Data

Dec. 21, 2018 (EP) .................... 18215274

(51) Int. Cl.
| | |
|---|---|
| *C08L 23/06* | (2006.01) |
| *C08J 9/12* | (2006.01) |
| *H01B 3/44* | (2006.01) |
| *C08K 3/26* | (2006.01) |
| *C08K 3/34* | (2006.01) |
| *C08K 3/36* | (2006.01) |
| *H01B 11/02* | (2006.01) |
| *H01B 11/18* | (2006.01) |

(52) U.S. Cl.
CPC .............. *C08L 23/06* (2013.01); *C08J 9/122* (2013.01); *H01B 3/441* (2013.01); *C08K 2003/265* (2013.01); *C08K 3/34* (2013.01); *C08K 3/346* (2013.01); *C08K 3/36* (2013.01); *C08L 2203/14* (2013.01); *C08L 2203/202* (2013.01); *C08L 2205/025* (2013.01); *C08L 2207/062* (2013.01); *C08L 2207/066* (2013.01); *H01B 11/02* (2013.01); *H01B 11/18* (2013.01)

(58) Field of Classification Search
CPC .............. C08L 23/06; C08L 2205/02; C08L 2205/025; C08L 2203/14; H01B 3/441; H01B 11/18; H01B 11/02; C08J 9/06; C08J 9/122; C08K 3/34; C08K 3/346; C08K 3/36; C08K 2003/265
See application file for complete search history.

(56) References Cited

U.S. PATENT DOCUMENTS

| | | | | |
|---|---|---|---|---|
| 6,130,385 A | * | 10/2000 | Tuunanen | H01B 3/441 |
| | | | | 174/110 F |
| 6,777,470 B2 | * | 8/2004 | Seip | C08K 5/3435 |
| | | | | 524/437 |
| 9,809,691 B2 | * | 11/2017 | Yi | C08K 3/013 |
| 11,242,449 B2 | * | 2/2022 | Bergqvist | C08J 9/0004 |
| 2008/0166537 A1 | * | 7/2008 | Frankowski | H01B 3/30 |
| | | | | 428/304.4 |
| 2010/0196641 A1 | * | 8/2010 | De Vos | C08J 9/08 |
| | | | | 521/134 |
| 2011/0065819 A1 | * | 3/2011 | Schips | C08J 9/0061 |
| | | | | 521/59 |
| 2015/0045469 A1 | | 2/2015 | Nichols et al. | |
| 2017/0267828 A1 | * | 9/2017 | Sun | C08L 23/06 |
| 2018/0346676 A1 | * | 12/2018 | Chen | C08J 9/122 |
| 2022/0064418 A1 | * | 3/2022 | Wannerskog | C08L 23/06 |

FOREIGN PATENT DOCUMENTS

| | | | | |
|---|---|---|---|---|
| CN | 101679659 A | | 3/2010 | |
| CN | 104133275 A | * | 11/2014 | .............. G02B 6/44 |
| CN | 106554535 A | * | 4/2017 | .............. B29C 41/52 |
| JP | 8-185720 A | * | 7/1996 | .............. H01B 11/18 |
| JP | 10120835 A | * | 5/1998 | .............. C08L 23/04 |
| JP | 2000204203 A | * | 7/2000 | ............... C08J 9/12 |
| JP | 2668198 | | 10/2007 | |
| SU | 1100286 A | | 6/1984 | |
| TW | 482726 B | | 4/2002 | |
| WO | WO 1999/061520 A1 | | 12/1999 | |
| WO | WO 2004-094526 A1 | | 11/2004 | |
| WO | WO 2008/097952 A1 | * | 8/2008 | ............... C08J 9/00 |

(Continued)

OTHER PUBLICATIONS

CN 106554535 A (Apr. 5, 2017); Sun et al.; machine translation. (Year: 2017).*
JP 2000-204203 A (Jul. 25, 2007); Sakamoto et al.; machine translation. (Year: 2007).*
CN 104133275 A (Nov. 5, 2014); Liu, Ganwei; machine translation. (Year: 2014).*
JP 10-120835 A (May 12, 1998); Sakamoto, Toshio; machine translation. (Year: 1998).*

(Continued)

*Primary Examiner* — Rip A Lee

(74) *Attorney, Agent, or Firm* — Lippes Mathias LLP

(57) ABSTRACT

The present invention concerns a foamable polymer composition and a foamed polymer composition obtained by foaming this foamable polymer composition. The invention is also concerned with a cable comprising at least one layer which comprises the foamable polymer composition or the foamed polymer composition. The invention further provides a process for producing a foamed polymer composition.

13 Claims, No Drawings

(56) References Cited

FOREIGN PATENT DOCUMENTS

WO     2009138241  A1   11/2009
WO     2016082212  A1    6/2016

OTHER PUBLICATIONS

JP 8-185720 A (Jul. 16, 1996); machine translation. (Year: 1996).*
CN 104133275 (Nov. 5, 2014); machine translation. (Year: 2014).*
International Search Report dated Feb. 3, 2020 in PCT/EP2019/083556.
International Serach Report of Application No. PCT/EP2019/083556 Dated Apr. 14, 2022.

* cited by examiner

FOAMING BEHAVIOUR OF POLYMER COMPOSITIONS USING PASSIVE NUCLEATION

This application is a 371 of PCT Application Serial No. PCT/EP2019/083556, filed Dec. 3, 2019, which claims priority to European Application Serial No. 18215274.4, filed Dec. 21, 2018, the contents of which are included herein in their entirety.

The present invention concerns a foamable polymer composition and a foamed polymer composition obtained by foaming this foamable polymer composition. The invention is also concerned with a cable comprising at least one layer which comprises the foamable polymer composition or the foamed polymer composition. The invention further provides a process for producing a foamed polymer composition.

BACKGROUND

Communication cables are used to transmit signals of high frequency (HF), either through electromagnetic waves or as light pulses as in fibre optical cables. Examples for communication cables are coaxial cables. Coaxial cables consist of two separate parallel conductors laid concentrically along the same axis and are separated by an insulating dielectric. Foamed LDPE, for example, alone or blended with another polymer, is routinely used to insulate communication cables, such as coaxial cable and/or radio frequency cable. The foaming of polymer composition can be done either using chemical or physical blowing agents, or a combination of both.

Chemical blowing agents are substances which release blowing gas through thermal decomposition reactions and the chemical blowing agent is consumed in the foaming reaction. Examples of such substances are hydrazine, hydrazide, azodicarbonamide (ADCA), or those based on combinations of solid organic acids (or a metal salt thereof) and alkali metal carbonate(s) or alkali metal bicarbonate (s), such as combination of citric acid/derivate of citric acid and sodium bicarbonate.

Physical blowing agents are gasses which are injected directly into the polymer melt. In such processes it is common to use chemical blowing agents as cell nucleators as the gas formed by the blowing agent reaction serves as nucleating points with lower energy for bubble formation. The gas used as physical blowing agent can be, for example, $N_2$ or $CO_2$.

A nucleating agent, nucleator or kicker, is normally used in physical foaming processes. The nucleating agent provides points in the insulation where the energy needed for bubble formation is lower. These nucleating agents can be either passive or active. An active nucleating agent is a substance that decomposes into gaseous products i.e. a chemical blowing agent, while passive nucleating agents are particles that only provide local points of lower energy where bubble formation is more likely to happen. In general, passive nucleators, i.e. nucleating agents that do not undergo a chemical reaction to form gas, are regarded as less effective than active nucleating agents, such as ADCA.

Both chemical and physical foaming extrusion processes are used for extrusion of foamed communication cable insulation. For communication cables it is critical to have a good cell structure within the foamed insulation in order to have isotropic electrical properties. It is desired to have a cell structure with many small cells evenly distributed within the insulation. The cell structure is also important for mechanical properties. Having many small cells that are well distributed will give better crush resistance compared to a structure with larger cells that are not homogeneously distributed as this will give weak parts in the insulation.

The main blowing agent used in the cable industry is azodicarbonamide (ADCA) which has a decomposition temperature range fitting well into the processing window of polyolefins, such as polyethylene, and gives fine foam structure, which is a key requirement for cable applications. Due to inclusion of ADCA on the REACH (Registration, Evaluation, Authorisation and Restriction of Chemicals) candidate list and the risk of future inclusion on authorisation list, there are a lot of efforts put into finding an alternative solution. The reason for ADCA being identified as a SVHC (substance of very high concern) and included in the candidate list is that it has been identified as a respiratory sensitizer with known cases of asthma in workers exposed to ADCA in powder form.

Another issue with azodicarbonamide is that ammonia is released from the blowing agent decomposition reactions. This is disturbing the working environment for cable manufacturers as it gives a bad smell.

Alternatives to ADCA which are compatible with the processing window of polyethylene are the endothermic blowing agents. Endothermic blowing agents are conventionally combinations of sodium bicarbonate and citric acid or a derivative of citric acid. These blowing agents are normally added directly to the extruder hopper, or dry mixed with polyolefins prior to extrusion. In high speed extrusion processes like cable extrusion, this way of adding the blowing agent does not provide sufficient homogenisation of the blowing agent in the polymer melt and this results in a foamed insulation with poor cell structure and bad surface.

Another drawback with endothermic blowing agents is that they produce polar decomposition products, such as water. Such polar decomposition products can have a negative impact on electrical properties of the insulation at high frequencies, such as the dissipation factor. This is especially disadvantageous for high frequency applications, such as coaxial cables.

WO 2004/094526 relates to foam compositions and cable having a low loss foam layer. A co-blowing agent selected from hydrofluorocarbons (HFC), hydrochlorofluorocarbons (HCFC) and perfluorocarbons (PFC) is used to obtain the low loss foam. Such compounds used as co-blowing agent, however, do have a negative influence on the environment.

It is an object of the invention to provide a foamable polymer composition which overcomes the above-mentioned problems.

It is a further object of the invention is to replace hydrazine, hydrazide or azodicarbonamide (ADCA) in a foamable polymer composition, while maintaining an improved cell structure, i.e. small and uniform distribution of cells in the foam, in the foamed product.

It is still a further an object of the invention to provide foamable polymer composition which is not foamed by using hydrofluorocarbons (HFC), hydrochlorofluorocarbons (HCFC) and perfluorocarbons.

It is still another object of the invention to provide a foamed polymer composition having reduced density and at the same time a high cell density, small cells uniformly distributed in the foamed polymer and maintaining an improved, i.e. low, dissipation factor.

The present invention is based on the surprising finding that all the above-mentioned objects can be solved by using a mineral nucleating agent, such as talc, in a foamable polymer composition.

The present invention therefore provides a foamable polymer composition comprising a first polyolefin polymer, a second polyolefin polymer having an MFR$_2$ (2.16 kg; 190° C.) of between 2 and 15 g/10 min measured according to ISO 1133-1, and a mineral nucleating agent in an amount of 0.5 to 6 wt. % based on the total foamable polymer composition, wherein the first polyolefin polymer has a higher density than the second polyolefin polymer.

The present invention further provides a foamed polymer composition obtained by foaming the foamable polymer composition according to the invention by using a blowing agent.

The present invention also provides a cable comprising at least one layer which comprises the foamable polymer composition according to the invention or the foamed polymer composition according to the invention.

The present invention has several surprising advantages. The inventive foamable polymer composition can be foamed into a foamed polymer composition without using noxious blowing agents such as ADCA and halogenated hydrocarbons and at the same time maintaining a good dissipation factor, in particular compared to polymer compositions being foamed by e.g. ADCA.

The foamed polymer composition obtained by foaming the foamable polymer composition exhibit a foam density comparable to that of foams using ADCA but having a comparable or even smaller cell size and a comparable or even higher cell density in the foam with respect to ADCA blown foams.

The present invention uses a mineral nucleating agent (C) as passive nucleating agent. The mineral nucleating agent is preferably a magnesium-containing compound, a calcium-containing compound, a silicon-containing compound or mixtures thereof.

Preferably the mineral nucleating agent comprises one or more selected from the group consisting of talc, clay, mica, calcium carbonate and silica. Among the aforementioned mineral nucleating agents, talc is preferred. Even more preferably the mineral nucleating agent consists of talc. Talc has the advantage that it neither contains water nor releases water during foaming. To obtain a uniform distribution of the mineral nucleating agent in the foamable polymer composition, the mineral nucleating agent is added, preferably compounded, to the foamable polymer composition in the form of a powder, i.e. in the form of small particles, or as a masterbatch. The average particle size is usually in the order of 0.1 µm to 50 µm.

As the nucleating agent is a mineral nucleating agent, its thermal decomposition temperature is high. This has the advantage that the mineral nucleating agent of the invention does not thermally decompose during, for instance, melting and extrusion of the polymer composition. Preferably, the mineral nucleating agent does not thermally decompose below 275° C., more preferably not below 300° C., even more preferably not below 350° C., even more preferably not below 400° C., even more preferably not below 500° C., even more preferably not below 600° C.

The foamable polymer composition according to the invention comprises a first polyolefin polymer (A) and a second polyolefin polymer (B). The first polyolefin polymer (A) has an MFR$_2$ (2.16 kg; 190° C.) of preferably 0.1 to 20 g/10 min, more preferably of 1 to 17 g/10 min, more preferably of 2 to 14 g/10 min, more preferably of 4 to 14 g/10 min, and most preferably of 6 to 10 g/10 min, measured according to ISO 1133-1.

The second polyolefin polymer (B) has an MFR$_2$ (2.16 kg; 190° C.) of 2 to 15 g/10 min measured according to ISO 1133-1. Preferably, the second polyolefin polymer (B) has an MFR$_2$ (2.16 kg; 190° C.) of 2.5 to 12 g/10 min, more preferably of 3 to 10 g/10 min, more preferably of 3.5 to 8 g/10 min, and most preferably of 4 to 6 g/10 min measured according to ISO 1133-1.

The first polyolefin polymer (A) is present preferably in amount of 20 to 95 wt. %, more preferably in an amount of 40 to 90 wt. %, more preferably in an amount of 50 to 85 wt. % and most preferably in an amount of 60 to 80 wt. %, based on the total foamable polymer composition and the second polyolefin polymer (B) is present preferably in an amount of 5 to 80 wt. %, more preferably in amount of 10 to 70 wt. %, more preferably in an amount of 15 to 60 wt. % and most preferably in an amount of 20 to 40 wt. %, based on the total foamable polymer composition.

The first polyolefin polymer (A) is preferably an ethylene homo- or copolymer or a propylene homo- or copolymer, more preferably an ethylene copolymer, and the second polyolefin polymer (B) is preferably an ethylene homo- or copolymer or a propylene homo- or copolymer, more preferably an ethylene homopolymer.

The first polyolefin polymer (A) is preferably a high density polyethylene homo- or copolymer having a density of 935 to 970 kg/m$^3$ measured according to ISO 1183-1 and the second polyolefin polymer (B) is preferably a low density polyethylene homo- or copolymer having a density of 880 to 930 kg/m$^3$ measured according to ISO 1183-1.

More preferably, the high density polyethylene (HDPE) is a copolymer and the low density polyethylene (LDPE) is a homopolymer. Homopolymer means that the low density polyethylene (LDPE) comprises at least 90 wt. % ethylene monomer, preferably at least 95 wt. % ethylene monomer, and most preferably at least 99 wt. % ethylene monomer.

In case the high density polyethylene (HDPE) is a copolymer, the copolymer comprises ethylene monomer, preferably in an amount of at least 50 wt. % based on the total copolymer, and one or more comonomer(s). The comonomer can be alpha-olefins having 3 to 12 carbon atoms, e.g. propene, butene, hexene, octene, decene.

The low density polyethylene (LDPE) is preferably a homopolymer.

For foamed polyethylene used in communication cables, both electrical and mechanical properties are important. HDPE has a lower dielectric constant and lower loss factor than LDPE as well as higher strength and hardness.

The high density polyethylene (HDPE) polymer is polymerised in low pressure process, and is, for example, an optionally HDPE homopolymer or an optionally HDPE copolymer of ethylene with one or more comonomer(s) as described above. Further, the HDPE is polymerised in a low pressure polymerisation process in the presence of a catalyst. The catalyst can be for example a Phillips catalyst, a metallocene catalyst or a Ziegler-Natta catalyst. The polymerisation can be for example either gas phase polymerisation, slurry polymerisation or a combination of slurry polymerisation/gas-phase polymerisation or gas-phase polymerisation/gas-phase polymerisation. The polymerisation can also be solution polymerisation.

In order to foam a foamable polymer composition it is necessary that the foamable polymer composition has a good melt strength as too poor melt strength results in a collapsed cell structure which is not good for either mechanical or electrical properties of the cable layer, typically insulation layer. The melt strength can be improved by blending in a LDPE in the foamable polymer composition in order to improve the melt strength and to ensure a foamed layer with a closed cell structure and homogeneous cell distribution.

The low density polyethylene (LDPE) polymer is polymerised in a high pressure radical polymerisation process. Further, the LDPE is polymerised in a high-pressure polymerisation process in the presence of an initiator(s) and chain transfer agents, such as propane, propene, propione aldehyde and methyl ethyl ketone, to control the MFR.

The LDPE can be produced in, for example, a tubular polymerisation reactor, or in an autoclave polymerisation reactor.

The dissipation factor, also known as tan δ, is a measure of the degree of power dissipation in a dielectric material, i.e. a measure how much of the electrical energy that is transformed into heat in the dielectric material. The inventive foamable polymer composition has preferably a dissipation factor at 1.9 GHz of $80 \cdot 10^{-6}$ to $270 \cdot 10^{-6}$, more preferably $120 \cdot 10^{-6}$ to $260 \cdot 10^{-6}$, and most preferably of $130 \cdot 10^{-6}$ to $240 \cdot 10^{-6}$.

The foamable polymer composition comprises preferably an antioxidant. The antioxidant is preferably a phenolic antioxidant, a phosphorous containing antioxidant or blends thereof, more preferably a blend thereof. The phenolic antioxidant is preferably a blend of pentaerythrityl-tetrakis (3-(3',5'-di-tert-butyl-4-hydroxyphenyl)-propionate (CAS-no. 6683-19-8; commercially available from BASF under trade name Irganox 1010) and tris-(2,4-di-tert-butylphenyl) phosphite (CAS-no. 31570-04-4; commercially available from BASF under trade name Irgafos 168). This antioxidant blend is commercially available as Irganox B561 from BASF.

The antioxidant is present preferably in an amount of 0.01 wt. % to 2 wt. %, more preferably in an amount of 0.04 wt. % to 1 wt. %, and most preferably in an amount of 0.08 wt. % to 0.5 wt. %, based on the total foamable polymer composition.

The foamable polymer composition preferably comprises an acid scavenger. The acid scavenger is preferably a calcium stearate, a sodium stearate, a zinc stearate, or mixtures thereof, more preferably a zinc stearate.

The amount of acid scavenger is preferably 0.01 wt. % to 2 wt. %, more preferably 0.02 wt. % to 1 wt. %, and most preferably 0.04 wt. % to 0.08 wt. %, based on the total foamable polymer composition.

A foamed polymer composition can be obtained by foaming the foamable polymer composition according to the invention by using a blowing agent (D).

The foaming is a physical foaming process which means that the blowing agent (D) is injected into or mixed with the foamable polymer composition. The particles of the mineral nucleating agent present in the foamable polymer composition act as local points of lower energy where bubble formation is more likely to happen. The blowing agent (D) is injected into or mixed with the foamable polymer composition, preferably during extrusion of the foamable polymer composition in an extruder. During extrusion the blowing agent (D) is melt mixed with the molten polymer composition and the molten polymer composition is allowed to expand at the exit from the die of the extruder. The temperature during extrusion is preferably from 130° C. to 240° C. The extrusion is preferably performed in a gas injection foaming line.

The blowing agent (D) comprises preferably a gas, and the gas comprises $N_2$, $CO$, $CO_2$, Ar or mixtures thereof. More preferably, the blowing agent (D) comprises $N_2$ and/or $CO_2$, more preferably the blowing agent (D) consists of $N_2$ and/or $CO_2$.

The blowing agent (D) is used preferably in amount of 0.01 wt. % to 5 wt. %, more preferably 0.015 wt. % to 2.5 wt. %, more preferably in amount of 0.02 wt. % to 0.2 wt. %, more preferably in amount of 0.03 wt. % to 0.1 wt. %, based on the foamable polymer composition.

Preferably, the blowing agent (D) does not comprise a hydrocarbon, a halogenated hydrocarbon, citric acid or derivatives of citric acid, azodicarbonamide or mixtures thereof. Halogenated hydrocarbons are, for example, hydrofluorocarbons (HFC), hydrochlorofluorocarbons (HCFC) and perfluorocarbons (PFC).

The foamed polyolefin composition has a mean cell diameter preferably of 5 μm to 500 μm, more preferably of 50 μm to 400 μm, more preferably 100 μm to 300 μm, more preferably 150 μm to 275 μm, more preferably of 155 μm to 260 μm, and most preferably of 160 μm to 250 μm.

The foamed polymer composition has a density preferably of 85 kg/m³ to 870 kg/m³, more preferably 150 kg/m³ to 860 kg/m³, more preferably 300 kg/m³ to 850 kg/m³, more preferably of 350 kg/m³ to 800 kg/m³, and most preferably of 400 kg/m³ to 775 kg/m³.

The invention provides a cable comprising at least one layer which comprises the foamable polymer composition according to the invention or the foamed polymer composition according to the invention. Thus, the cable comprises at least one layer which comprises the foamable polymer composition according to any of the embodiments described above, or the cable comprises at least one layer which comprises the foamed polymer composition according to any of the embodiments described above.

Preferably, the cable is a communication cable, preferably a coaxial cable, or a twisted pair cable.

The at least one layer is preferably an insulation layer of the cable. The insulation layer is a layer surrounding the innermost conducting wire, the conducting wire usually made of copper. Preferably, a skin layer is arranged between the innermost conducting wire and the insulation layer. The typical thickness of the insulation layer is from 0.01 mm to 80 mm for coaxial cables and 0.1 mm to 2 mm for twisted pair cables.

The foamed polymer composition according to the invention can be preferably produced by a process for producing a foamed polymer composition, the method comprising the steps of
  a) providing a foamable polymer composition according to the invention,
  b) melt mixing the foamable polymer composition with a blowing agent (D) at a temperature of 130° C. to 240° C. to obtain a molten polymer composition, and
  c) foaming the molten polymer composition.

Preferably, the melt mixing of step b) takes place in an extruder and the foaming of the obtained molten polymer composition in step c) takes place after the molten polymer composition exits a die of the extruder. In the extruder, the foamable polymer composition is molten and mixed with the blowing agent (D) to obtain a molten polymer composition. The temperature in step b) is preferably 140° C. to 230° C.

Preferably, the extruder can be any extruder known in the art suitable for melt mixing a polymer melt with a blowing agent.

All the above described embodiments of the foamable polymer composition according to the invention are also preferred embodiments of the foamable polymer composition used in the process for producing a foamed polymer composition.

All preferred embodiments of the blowing agent (D) as described above are preferred embodiments of the blowing agent (D) used in the process for producing a foamed polymer composition.

EXAMPLES

1. Measurement Methods a) Melt Flow Rate

The melt flow rate (MFR) is determined according to ISO 1133-1 and is indicated in g/10 min. The MFR is an indication of the flowability, and hence the processability, of the polymer. The higher the melt flow rate, the lower the viscosity of the polymer.

The $MFR_2$ of polyethylene (co-)polymers is measured at a temperature 190° C. and at a load of 2.16 kg. The $MFR_2$ of polypropylene (co-)polymers is measured at a temperature 230° C. and at a load of 2.16 kg.

b) Density of the Solid Material

The method for determining the density of the foamable polymer compositions is following ISO 17855-2 for sample preparation and ISO 1183-1/method A for the density measurement.

Compression moulding is done in a controlled cooling press, with a moulding temperature of 180° C. for polyethylene, and a cooling rate of 15° C./min. The specimens are conditioned at 23±2° C. for minimum of 16 hours. Density is determined at 23±0.1° C. using isododecane as the immersion-liquid, and with no buoyancy correction.

c) Density of the Foamed Material

To determinate the density of the foamed samples the weight of each specimen was measured in air atmosphere ($w_L$ in g) as well as in a medium with known temperature ($w_W$ in g). All the measurements were performed at 22° C. in distilled water with 3 drops of a wetting agent added. For the calculation of the density, the following equation was used:

$$\rho = \frac{w_L}{w_L - w_W}(\rho_W - \rho_L) + \rho_L$$

where
$\rho$=density in $g/cm^3$
$\rho_W$=density of water in $g/cm^3$ at the measuring temperature
$\rho_L$=density of air (0.0012 $g/cm^3$)

d) Calculated Cell Density

The cell density ($N_b/cm^3$) of foamed polymer compositions has been calculated as follows:

$$N_b = \frac{1 - \frac{\rho_F}{\rho_m}}{\frac{\pi}{6}D^3}$$

where
$\rho_F$=density of the foamed specimen in $g/cm^3$
$\rho_m$=density of the polymer matrix in $g/cm^3$
D=mean cell diameter in cm e) Calculation of Density Reduction Density reduction (X) in percentage is calculated with the following formula:

$$X = \left(1 - \frac{D_F}{D_S}\right) * 100$$

where
$D_S$=density of the solid material in $kg/m^3$
$D_F$=density of the foamed material in $kg/m^3$ f) Determination of Mean Cell Diameter For the determination of the mean cell diameter, the cross-sectional area of about 60 cells (if available) was measured. Therefore the cells were marked manually in the picture analysing software of the Alicona system. The mean diameters of the cells were calculated under the assumption that the bubbles have a circular cross section. This method helps to compare the foam morphologies of the different samples, because the geometry of most of the cells differs from the ideal round shape and so a reasonable comparison of direct measured diameters is not possible.

By using the following equation and subsequently averaging the calculated values of each bubble diameter the mean diameter was determined.

$$D_Z = \sqrt{\frac{4A_Z}{\pi}}$$

where
$D_Z$=diameter of one foam cell under the assumption of a circular cross section in μm
$A_Z$=cross section of one foam bubble in $μm^2$ g) Microscopy Analysis of Foamed Polymer Compositions All samples were examined with respect to their density and foam morphology.

For this reason the cell size was measured using the light microscope Alicona InfiniteFocus (Alicona Imaging GmbH, Austria). The density was determined using a high precision balance (Excellence XS Analyse Waage, Mettler Toledo AG, Switzerland) equipped with a density measurement kit (Density Kit, Mettler Toledo AG, Switzerland).

2. Dielectric Properties (Dielectric Loss Tangent Value (Tan δ)–Dissipation Factor)

a) Preparation of the Plaques:

Polymer compounds have been compression moulded at 140° C. in a frame to yield plates of 4 mm thickness, 80 mm width and 130 mm length. The pressure has been adjusted high enough to obtain a smooth surface of the plates. A visual inspection of the plates showed no inclusions such as trapped air or any other visible contamination.

b) Characterization of the Plaques for Dielectric Properties:

For the measurement of the dielectric constant and the tangent delta (tan δ) of the materials, a split-post dielectric resonator has been used together with a network analyser (Rodhe & Schwarz ZVL6). The technique measures the complex permittivity of dielectric laminar specimen (plaques) in the frequency range from 1-10 GHz. The test is conducted at 23° C.

The split-post dielectric resonator (SPDR) was developed by Krupka and his collaborators [see: J. Krupka, R. G. Geyer, J. Baker-Jarvis and J. Ceremuga, 'Measurements of the complex permittivity of microwave circuit board substrates using a split dielectric resonator and re-entrant cavity techniques', Proceedings of the Conference on Dielectric Materials, Measurements and Applications—DMMA '96, Bath, UK, published by the IEE, London, 1996.] and is one of the easiest and most convenient techniques to use for measuring microwave dielectric properties. Two identical dielectric resonators are placed coaxially along the z-axis so that there is a small laminar gap between them into which the specimen can be placed to be measured. By choosing suitable dielectric materials the resonant frequency and Q-factor of the SPDR can be made to be temperature stable. Once a resonator is fully characterized, only three parameters need to be measured to determine the complex permittivity of the specimen: its thickness and the changes in resonant frequency, Δf, and in the Q-factor, ΔQ, obtained when it is placed in the resonator.

Specimens of 4 mm thickness have been prepared by compression moulding as described above and measured at a high frequency of 1.9 GHz.

A comprehensive review of the method is found in J. Krupka, R. N. Clarke, O. C. Rochard and A. P. Gregory, "Split-Post Dielectric Resonator technique for precise measurements of laminar dielectric specimens—measurement uncertainties" in Proceedings of the XII1 Int. Conference MIKON'2000, Wroclaw, Poland, pp 305-308, 2000.

3. Materials

As the HDPE component a unimodal Ziegler-Natta catalysed HDPE copolymer with butene as comonomer was used with $MFR_2$ of 8 g/10 min and a density 963 kg/m³.

LDPE is an autoclave LDPE homopolymer having an $MFR_2$ of 4.5 g/10 min and a density of 923 kg/m³.

nCore 7155-M1-300 is a commercially available azodicarbonamide (ADCA) based blowing agent master batch from Americhem. It contains 15% of active blowing agent.

Hydrocerol NUC 5155 is a nucleation masterbatch containing 50% talc in a polyethylene carrier. It is commercially available from Clariant.

Irganox B561 is an antioxidant blend commercially available from BASF.

Zincum TX is a zinc stearate acid scavenger, commercially available from Baerlocher.

Mistrocell M90 is talc, commercially available from Imerys Talc. The particle size is d50=3.4 μm, and BET is 11.0 m²/g.

4. Preparation of Examples 4.1 Mixing of Materials

The examples in Table 1 and 3 were compounded on BUSS MDK46 continuous extruder (construction year 1985). The line is a single-screw kneader with screw diameter of 46 mm and 11 L/D.

TABLE 1

Composition of comparative (CE) and inventive (IE) examples for foaming, amounts are given in wt. %

| Material | CE1 | IE1-1 | IE1-2 |
|---|---|---|---|
| HDPE, wt. % | 69.6 | 69.6 | 69.6 |
| LDPE, wt. % | 29.8 | 28.25 | 26.25 |
| Irganox B561, wt. % | 0.1 | 0.1 | 0.1 |
| Zincum TX, wt. % | 0.05 | 0.05 | 0.05 |
| NCore 7155-M1-300, wt. % | 0.45 | | |
| Hydrocerol NUC 5515, wt. % | | 2 | 4 |
| Density, kg/m³ | 947.4 | 958.9 | 966.3 |

4.2 Extrusion and Foaming

Polymer pellets of the compositions of Table 1 have been extruded on a Rosendahl RE45 extrusion line with 45 mm diameter screw. The extruder has a total length of 32 D, including an 8 D long, oil tempered cylinder elongation used for a better control of the polymer melt temperature. To realize a higher dwell time and a better homogenization a static mixer (type SMB-R from Sulzer, Switzerland) with a length of 4 D is mounted between the cylinder elongation and the extrusion die. A round die of 4.0 mm was used. The extruder had 10 temperature zones and the gas ($N_2$) was injected between zone 7 and 8.

The temperature settings in ° C. were as follows (slash denotes different temperature zones):

$T_1$: 40/150/160/160/165/170/190/190/170/170/170/170/170° C.

Results are given in Table 2 below. Density of the foam is measured at 22° C.

TABLE 2

Properties of the obtained foamed compositions

| Ex. | Nitrogen amount wt. % | Temperature setting/melt temp (° C.) | Mean cell diameter μm | Density kg/m³ | Density reduction % | Calculated cell density Nb/cm³ |
|---|---|---|---|---|---|---|
| CE1 | 0.04 | $T_1$/186 | 191 | 678 | 28.4 | 7.71 · 10⁴ |
| CE1 | 0.05 | $T_1$/186 | 167 | 470 | 50.4 | 2.07 · 10⁵ |
| IE1-1 | 0.04 | $T_1$/188 | 242 | 591 | 38.4 | 5.05 · 10⁴ |
| IE1-1 | 0.05 | $T_1$/188 | 212 | 460 | 52.0 | 1.03 · 10⁵ |
| IE1-2 | 0.04 | $T_1$/188 | 198 | 549 | 43.2 | 1.03 · 10⁵ |
| IE1-2 | 0.05 | $T_1$/189 | 182 | 438 | 54.7 | 1.71 · 10⁵ |

The electrical loss factor (dissipation factor) has been measured on Comparative Example 2 and Inventive examples IE2-1 to IE2-3. The composition of all examples is given in Table 3 below. After compounding as described above, all materials were compression moulded under foaming temperature (140° C.) as described above. Those plaques were submitted to loss factor measurement at 1.9 GHz (tan δ).

TABLE 3

Composition of comparative (CE) and inventive (IE) examples with amounts given in wt. %, and results of fmeasurement of dissipation factor before oaming.

| Material | CE2 | IE2-1 | IE2-2 | IE2-3 |
|---|---|---|---|---|
| HDPE/wt. % | 69.6 | 69.6 | 69.6 | 69.6 |
| LDPE/wt. % | 29.95 | 28.4 | 26.4 | 29.4 |
| NCore 7155-M1-300/wt. % | 0.45 | | | |
| Hydrocerol NUC 5515/wt. % | | 2.0 | 4.0 | |
| Mistrocell M90/wt. % | | | | 1.0 |
| Dissipation factor at 1.9 GHz (·10⁻⁶) | 140 | 141 | 135 | 172 |

As can be seen from Table 3, using talc as passive nucleating agent gives comparable or even better dissipation factor than CE2 which uses ADCA, i.e. a chemical blowing agent.

The invention claimed is:

1. A cable comprising at least one layer which comprises a foamable polymer composition, the foamable polymer composition comprising:
    (A) a first polyolefin polymer which is a high-density polyethylene,
    (B) a second polyolefin polymer which is an autoclave low density polyethylene having an $MFR_2$ (2.16 kg; 190° C.) of 2 to 15 g/10 min measured according to ISO 1133-1, and (C) a mineral nucleating agent in an amount of 0.5 to 6 wt % based on a total foamable polymer composition, wherein the first polyolefin polymer (A) has a higher density than the second polyolefin polymer (B);

wherein the foamable polymer composition does not comprise hydrazine, hydrazide or azodicarbonamide (ADCA); and wherein the first polyolefin polymer (A) is present in amount of 20 to 95 wt % based on the total foamable polymer composition and wherein the second polyolefin polymer (B) is present in an amount of 5 to 80 wt % based on the total foamable polymer composition; and wherein the foamable polymer composition has a dissipation factor at 1.9 GHz of between $80 \cdot 10^{-6}$ to $270 \cdot 10^{-6}$.

2. The cable according to claim 1, wherein the at least one layer is an insulation layer.

3. The cable according to claim 1, wherein the cable is a coaxial cable or a twisted pair cable.

4. The cable according to claim 1, wherein the foamable polymer composition further comprises an antioxidant.

5. The cable according to claim 1, wherein the foamable polymer composition further comprises an acid scavenger.

6. The cable according to claim 1, wherein the mineral nucleating agent (C) comprises one or more selected from the group consisting of talc, clay, mica, calcium carbonate and silica.

7. The cable according to claim 1, wherein the first polyolefin polymer (A) has an $MFR_2$ (2.16 kg; 190° C.) of 0.1 to 20 g/10 min measured according to ISO 1133-1.

8. The cable according to claim 1, wherein the first polyolefin polymer (A) is a high density polyethylene homo- or copolymer having a density of 935 to 970 kg/m³ measured according to ISO 1183-1 and the second polyolefin polymer (B) is a low density polyethylene homo- or copolymer having a density of 880 to 930 kg/m³ measured according to ISO 1183-1.

9. A cable comprising at least one layer which comprises a foamed polymer composition obtained by foaming a foamable polymer composition that comprises:

(A) a first polyolefin polymer which is a high-density polyethylene, (B) a second polyolefin polymer which is an autoclave low density polyethylene having an $MFR_2$ (2.16 kg; 190° C.) of 2 to 15 g/10 min measured according to ISO 1133-1, and (C) a mineral nucleating agent in an amount of 0.5 to 6 wt % based on a total foamable polymer composition, wherein the first polyolefin polymer (A) has a higher density than the second polyolefin polymer (B);

wherein the foamable polymer composition does not comprise hydrazine, hydrazide or azodicarbonamide (ADCA); and wherein the first polyolefin polymer (A) is present in amount of 20 to 95 wt % based on the total foamable polymer composition and wherein the second polyolefin polymer (B) is present in an amount of 5 to 80 wt % based on the total foamable polymer composition; and wherein the foamable polymer composition has a dissipation factor at 1.9 GHz of between $80 \cdot 10^{-6}$ to $270 \cdot 10^{-6}$;

in the presence of a blowing agent (D); wherein the blowing agent (D) does not comprise a hydrocarbon, a halogenated hydrocarbon, citric acid or derivatives of citric acid, azodicarbonamide or mixtures thereof.

10. The cable according to claim 9, wherein the blowing agent (D) comprises $N_2$, CO, $CO_2$, Ar or mixtures thereof.

11. The cable according to claim 9, wherein the blowing agent (D) is used in amount of 0.01 wt % to 5 wt %, based on the foamable polymer composition.

12. The cable according to claim 9, wherein the foamed polyolefin composition has a mean cell diameter of between 5 µm to 500 µm.

13. The cable according to claim 9, wherein the foamed polymer composition has a density of 85 to 870 kg/m³.

* * * * *